Patented Nov. 30, 1926.

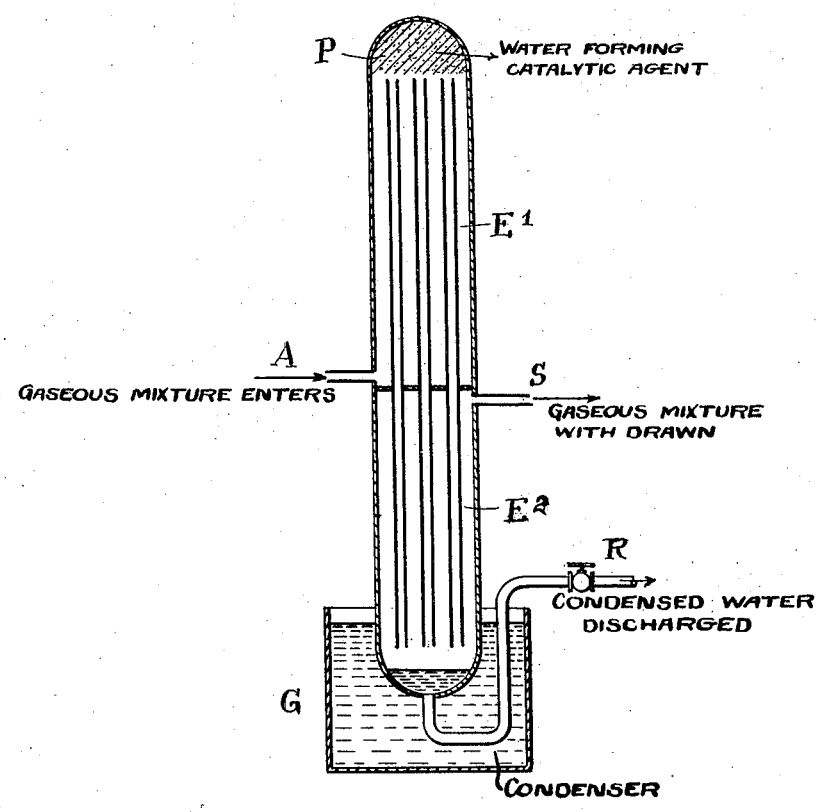

1,609,058

UNITED STATES PATENT OFFICE.

GEORGES CLAUDE, OF PARIS, FRANCE, ASSIGNOR, BY MESNE ASSIGNMENTS, TO LAZOTE INC., A CORPORATION OF DELAWARE.

SYNTHESIS OF AMMONIA.

Application filed July 19, 1921, Serial No. 485,939, and in Great Britain October 4, 1918.

(GRANTED UNDER THE PROVISIONS OF THE ACT OF MARCH 3, 1921, 41 STAT. L., 1313.)

The present invention has for its object the elimination of traces of oxygen from gaseous mixtures, and particularly from mixtures containing nitrogen and hydrogen which are used under high pressure in the direct synthesis of ammonia and to an improved process of producing ammonia in which the major portion of the water vapor present in the gaseous mixture is removed before the gaseous mixture is subjected to the catalytic reaction. To accomplish such synthesis, it is essential that the gases be very pure, especially with respect to oxygen and this is of particular importance when the pressures used are exceedingly high, for example, within the range between 400 and 2,000 atmospheres which have been referred to in Letters Patent No. 1,332,460, March 2, 1920, as "hyperpressures".

The process employed in carrying out my invention involves the combination of traces of oxygen with a molecular proportion of hydrogen to form water vapor and consists in employing palladium-asbestos or platinum-asbestos in the heated condition as a catalytic agent. The invention provides very effective physical means for accomplishing the removal of the water vapor formed by the combination of oxygen and hydrogen. For this purpose, the mixture under high pressure is brought, after contact with the heated palladium-asbestos, into a cooler zone where the temperature of the mixture is reduced to the neighborhood of the freezing point of water, the mixture passing through a temperature exchanger which permits it to escape at substantially atmospheric temperature and with only the slightest traces of water, the greater part of which will have been condensed by the cold to which the mixture is subjected.

The accompanying drawing shows diagrammatically an apparatus adapted to the process above described. In the drawing $E_1$ is the primary temperature exchanger, A the inlet for the gases, and P the palladium-asbestos which may be heated by external means (not shown). $E_2$ is a secondary exchanger which may, however, be merely an extension of the primary exchanger and the lower end of which is cooled by immersion in a cooler. A temperature below 0° C. is maintained in the cooler, for example, by ice or evaporating alcohol.

The mixture of gases $N+H_3$ enters from the compressor at A, traverses the first compartment of the temperature exchanger $E_1$ and comes into contact with the heated palladium-asbestos P where all of the oxygen contained in the mixture combines with hydrogen to form water vapor. During its circulation in the opposite direction in the second compartment of the exchanger $E_1$, the gaseous mixture returns to a temperature only slightly higher than its admission temperature and immediately gives up, by condensation because of the high pressure, the greater part of the water vapor formed.

To condense substantially the remainder of this water vapor, the mixture is passed into the secondary exchanger $E_2$, the lower part of which is disposed in a vessel G which is maintained at a temperature in the neighborhood of the freezing point of water at the pressure employed ($-8°$ C. at 1,000 atmospheres, for example). The residual water vapor condenses until the vapor pressure thereof corresponds with the temperature. The purified mixture passes out of the apparatus at S. The condensed water may be discharged from the system periodically by means of a cock R.

It is apparent that the proportion of water remaining uncondensed in the mixture will be exceedingly small even with moderate cooling.

This relatively slight proportion of water is not detrimental in the synthesis of ammonia, and the gaseous mixture after treatment as described may be delivered to the apparatus in which the synthesis is conducted, the pressure of the mixture being already such as to promote the synthesis as set forth in the Letters Patent above noted.

I claim:

1. The process of eliminating oxygen from gaseous mixtures for the synthesis of ammonia under hyperpressure, which consists in passing the gaseous mixture under hyperpressure in contact with a heated water-forming catalytic agent, cooling the gas while still under hyperpressure to a temperature in the neighbourhood of the freezing point of water at the pressure maintained to condense the water vapor in a liquid state and separating the water at such pressure.

2. The process of eliminating oxygen from gaseous mixtures for the synthesis of ammonia under hyperpressure, which consists in heating the mixture under hyperpressure in heat-exchange relation with preceding portions thereof, causing the heated mixture to contact with a heated water-forming catalytic agent, cooling the mixture while still under hyperpressure in heat-exchange relation with further incoming portions thereof, further cooling the mixture to a temperature in the neighbourhood of the freezing point of water at the pressure maintained to condense the water vapor in a liquid state and separating the water at such pressure.

3. The process of eliminating oxygen from gaseous mixtures for the synthesis of ammonia under hyperpressure, which consists in heating the mixture under hyperpressure in heat-exchange relation with preceding portions thereof, causing the heated mixture to contact with a heated water-forming catalytic agent, cooling the mixture while still under hyperpressure in heat-exchange relation with further incoming portions thereof, further cooling the mixture to a temperature in the neighbourhood of the freezing point of water at the pressure maintained to condense the water vapor in a liquid state and separating the water at such pressure and again heating the mixture substantially to atmospheric temperature in heat-exchange relation with succeeding portions thereof.

4. The process of eliminating oxygen from gaseous mixtures for the synthesis of ammonia under hyperpressure, which consists in heating the mixture under hyperpressure in heat-exchange relation with preceding portions thereof, causing the heated mixture to contact with a heated water-forming catalytic agent, cooling the mixture while still under hyperpressure in heat-exchange relation with further incoming portions thereof, further cooling the mixture in heat-exchange relation with preceding portions thereof, further cooling the mixture by the application of external cold to a temperature in the neighbourhood of the freezing point of water under hyperpressure to condense the water vapor in a liquid state, separating the water at such pressure, reheating the cold mixture substantially to atmospheric temperature in heat-exchange relation with succeeding portions of the water-containing mixture.

5. The process of eliminating oxygen from gaseous mixtures for the synthesis of ammonia under hyperpressure, which consists in causing the gaseous mixture under hyperpressure to travel in a passage in heat-exchange relation with preceding portions thereof, and at the end of said passage over a water-forming catalytic agent, then causing it to travel in an inverse direction first for the above heat-exchange and then in the same enclosure for a second heat-exchange with preceding portions thereof, cooling the mixture under pressure by external cold at the end of this inverse travel to a temperature in the neighbourhood of the freezing point of water under hyperpressure to condense the water vapor in a liquid state and causing the mixture to travel in an inverse direction for the second heat-exchange relation which brings it substantially to atmospheric temperature.

6. The process of producing ammonia, employing a gaseous mixture of nitrogen and hydrogen containing water vapor, which consists in cooling the gaseous mixture under hyper-pressure, separating the water and thereafter passing the gaseous mixture of nitrogen and hydrogen together with the remaining water vapor over a catalyst under substantially the same hyper-pressure.

7. The process of producing ammonia, employing a gaseous mixture of nitrogen and hydrogen containing water vapor, which consists in cooling the gaseous mixture under hyperpressure to condense the water in a liquid state, separating the water and thereafter passing the gaseous mixture of nitrogen and hydrogen together with the remaining water vapor over a catalyst under substantially the same hyper-pressure.

8. The process of producing ammonia, employing a gaseous mixture of nitrogen and hydrogen containing water vapor, which consists in cooling the gaseous mixture to a temperature in the neighborhood of the freezing point of water at the pressure maintained to condense the water vapor in a liquid state, separating the water and thereafter passing the gaseous mixture of nitrogen and hydrogen together with the remaining water vapor over a catalyst under substantially the same hyper-pressure.

9. The process of treating gaseous mixtures in preparation for the synthesis of ammonia, which consists in passing the gaseous mixture under hyper-pressure in contact with a heated water-forming catalytic agent, cooling the gaseous mixture with an external refrigerant to a temperature sufficient to condense the major portion of the water and withdrawing the gaseous mixture at the hyper-pressure.

In testimony whereof I affix my signature.

GEORGES CLAUDE.